Dec. 15, 1970          R. G. SUTTON          3,547,753
RELEASE PAPER-POLYURETHANE FILM-POLYURETHANE FOAM LAMINATE
Filed Jan. 29, 1968

INVENTOR
ROBERT G. SUTTON
BY Cullen, Sloman, & Cantor
ATTORNEYS

3,547,753
RELEASE PAPER-POLYURETHANE FILM-POLYURETHANE FOAM LAMINATE

Robert G. Sutton, Philadelphia, Pa., assignor to Foamade Industries, Inc., Royal Oak, Mich., a corporation of Michigan
Filed Jan. 29, 1968, Ser. No. 701,402
Int. Cl. B32b 3/26, 7/06
U.S. Cl. 161—160        1 Claim

ABSTRACT OF THE DISCLOSURE

A laminate comprising a sheet of polyurethane foam as a substrate, and a sheet of casting-release paper-supported, polyurethane film, the film being heat fused to the substrate.

---

This invention relates to the process of laminating a thermoplastic film by fusion of the film to a substrate by a large surface area heated platen with release paper as the barrier between the heated platen and the film.

This process utilizes the large surface area of a heated platen to soften the thermoplastic film. The heated film would melt and stick to the heated platen without the release paper between it and the platen. The release paper also acts as a carrier for the film for continuous processing. The release paper is in intimate contact with heated platen on one side and the thermoplastic film on the other side. Various substrates, such as polyurethane foams, etc., are in contact with the thermoplastic film as it passes through the platen press. The softened film fuses and is thoroughly bonded to the substrate when removed from the heat. The release paper is stripped from the film when the film has cooled below its softening temperature.

This processing technique of lamination is unique in that a large surface area heated platen is used in contrast to a heated roll of any diameter. The heated roll process utilizes an extremely small surface area in contact with the thermoplastic film and results in slow rates of lamination with no control of preheating and softening of the film. If a larger wrap of the film and substrate is used on the heated roll, it must be subsequently unwrapped at the elevated temperature and this results in distortions of the film and/or the substrates to which the film is laminated.

One established technique used to laminate thermoplastic films to polyurethane foams is to flame laminate the foam to the film. This is a much more difficult process resulting in foam waste due to burn-off and a weaker bond of the foam to the films. The flame lamination process is also limited to approximately 0.5″ maximum thickness of the polyurethane foam. Any thickness of polyurethane foam available can be laminated using the process according to the instant invention.

Another technique used to bond thermoplastic films to various substrates is the dielectric press process. This process uses the heat of the dielectric press to fuse the film to the substrate. The process is limited to the usually small surface area of the platen, and requires set-up time, time for fusion during the electrical impulse heating, and cooling time before the press can be raised. This is a stop and go process and is extremely slow.

Other and further objects of the instant invention reside in the specific manipulative steps of the process described herein as well as in the properties, composition, and construction of articles of manufacture of the process hereof. Still other objects will in part be pointed out as the description of the invention proceeds and as shown in the accompanying drawing wherein.

Figure 1:
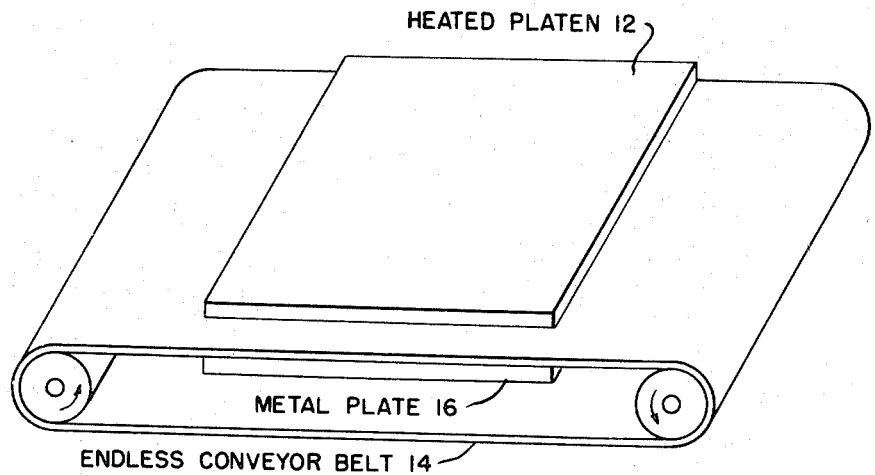
FIG. 1 is a perspective view of the laminating equipment required to bond, or fuse, a thermoplastic film to various substrates according to the instant invention.

Referring now to the drawings and more particularly to FIG. 1, a perspective view of the equipment required for fabricating the laminate according to the instant inventive concepts is shown. A heated platen 12 is used to heat the thermoplastic film beneath the release paper to fusion temperatures. The platen temperature is controlled to coincide with the softening temperature of the particular thermoplastic film being laminated and the speed of the conveyor belt 14 carrying the release paper and substrates being laminated. The larger the surface area of the heated platen in the direction of the conveyor, the faster the lamination.

The speed of lamination can also be increased as the temperature of the platen is increased. The platen height is adjustable to control pressure of the softened film and the substrate below the film. The fixed metal plate 16 under the conveyor belt is lined up under the heated platen and serves as a base for the substrate, film and paper passing under the platen.

Figure 2:
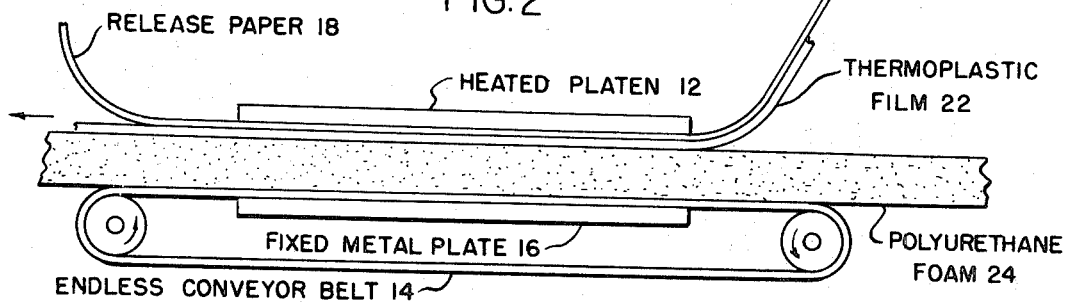
FIG. 2 is a side view of the process used to laminate a thermoplastic film to polyurethane foam using the release paper and heated platen technique according to the instant invention.

FIG. 2 shows the process of laminating a thermoplastic film 22, or a heat reacted adhesive, to the substrate, in this case a polyurethane foam 24. The release paper 18 passes under, and in direct contact with the heated platen 12. The film 22 is in direct contact with the under side of the release paper. The substrate to which the film is to be laminated may be leather, paper, cloth, other films, foams, metal or wood products or a multitude of materials to which it is desirable to laminate a continuous film.

Figure 3:
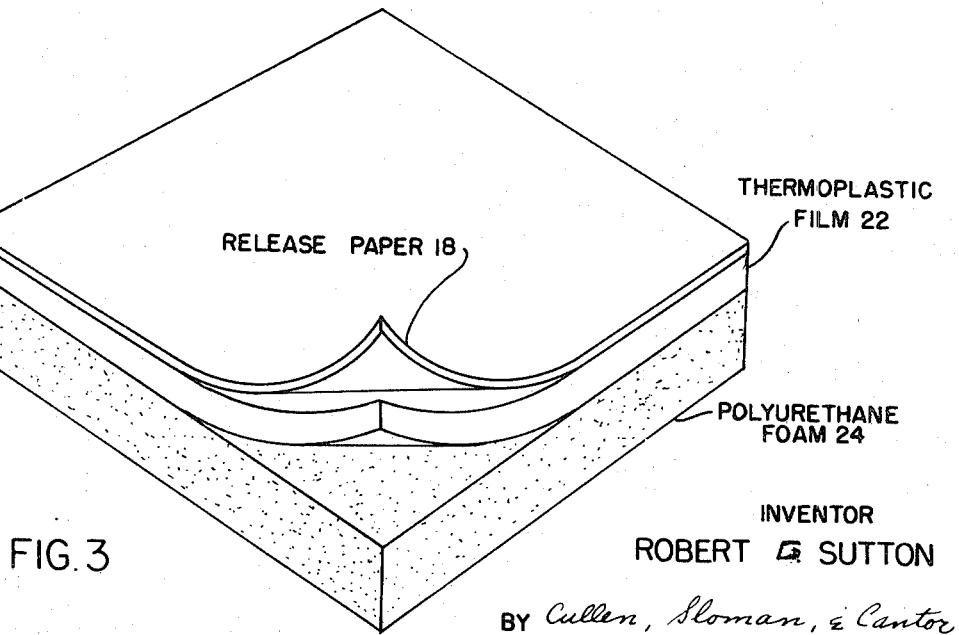
FIG. 3 is a perspective view of a laminate according to the instant invention illustrating the individual laminae thereof and the release paper an which the same may be made.

FIG. 3 shows a thermoplastic film polyurethane foam laminate formed according to the process of the instant invention with a thermoplastic film 22 laminated to a polyurethane foam 24. The release paper 18 is stripped off the film when the process is completed. The laminae 22, 24, are shown as separated for illustrative purposes only, although it is to be understood that in the final product, these will be fused together through their interfacial contact areas.

It is to be emphasized that the embodiments shown in the drawings are merely to be considered illustrative since many obvious modifications may be made in the materials used to form the laminae shown therein.

Thus, although it is preferred that the film be of thermoplastic resin composition, heat reacted adhesive films can also be laminated to the various substrates.

The preferred technique utilizing this process is as follows:

(1) Lay or cast the thermoplastic resin on the release paper. This may now become a carrier. This can be accomplished with polyvinyl chloride plastisols, polyurethane resin solutions, and heat reactive adhesive resin solutions.

(2) Then the resin and release paper unit is laminated to the substrate, and thus there results a laminate to the substrate with a uniform continuous film.

(3) The release paper is stripped off the film when the laminating process is completed.

The main advantage of having the film cast on the release paper is that the lamination of films down to 0.005″ can be laminated to polyurethane foam and other substrates with a uniform continuous film on the surface of the laminae.

Although it is preferred to use films which have been cast on the release paper, free films can also be laminated to various substrates utilizing the release paper as a barrier between the heated platen and the heat sensitive films. For example, extruded, calandered and blown films can be laminated to polyurethane foam using this technique. Two passes of the film on the substrate are usually required to obtain a continuous film on the surface of the polyurethane foam if this process is used.

With regard to the specific materials utilized for the film to be laminated to polyurethane foam and other substrates, polyurethane films and polyvinyl chloride films are preferred. However, cellulosic films, chlorinated polyether films, fluoroplastic films, nylon films polycarbonate films, polyester films, polyethylene films, polypropylene films, polyvinyl fluoride and vinyl films, as well as other thermoplastic resins which lend themselves to film products, may be used. The terms used here encompass both polymers as well as copolymers of these resins.

The aforementioned materials are not intended to be all-inclusive, but do provide a comprehensive list of conventional thermoplastic resins which are used in the manufacture of films.

There are several heat sensitive and heat reactive adhesive films commercially available and these may be laminated to polyurethane foams and other substrates using the techniques of the instant invention. These films can be free films on release papers or bonded to a carrier, such as polyester or mylar films. In most cases, the carrier types have a pressure sensitive adhesive release paper on the other side of the film carrier. This release paper serves the same purposes as heretofore mentioned as a barrier between the film and the heated platen. The heat sensitive type of adhesives are usually hot melts and the heat reactive adhesive films may be a blocked resin which unblocks at elevated temperatures.

Another distinct advantage of this instant invention is that thermoplastic films can be laminated to both sides of a polyurethane foam in one operation if a second platen is installed in the inverted position and down the line from the first.

Although it is believed that the instant inventive concepts can be readily understood from the foregoing, the following specific example is set forth to further illustrate the same.

EXAMPLE I

A thermoplstic polyurethane resin solution is cast onto a release paper and cured.

The cured polyurethane film is passed under a heated platen using the release paper as a barrier between the heat sensitive film and the platen. The substrate to which the film is to be laminated is carried through the press in intimate contact with the heated film. In this case, the substrate is a polyurethane foam.

Once the process is complete, the release paper is stripped off the film. Excellent interfacial bonding between the thermoplastic polyurethane film and the polyurethane foam results from the aforementioned technique and the laminae produced has a uniform and continuous film on the surface of the foam product.

What is claimed is:
1. A laminate comprising a sheet of polyurethane foam as a substrate,
and a sheet of casting-release paper-supported, polyurethane film, the film being heat fused to the substrate.

References Cited

UNITED STATES PATENTS

| | | | |
|---|---|---|---|
| 3,173,826 | 3/1965 | Campbell et al. | 161—161 |
| 3,398,035 | 8/1968 | Cleereman et al. | |
| 3,415,714 | 12/1968 | Hider. | |

WILLIAM J. VAN BALEN, Primary Examinuer

U.S. Cl. X.R.

156—230, 247, 306; 161—190, 406